United States Patent
Schroeder et al.

(10) Patent No.: US 10,222,976 B2
(45) Date of Patent: Mar. 5, 2019

(54) PATH GESTURES

(71) Applicant: SAP SE, Walldorf (DE)

(72) Inventors: Axel Schroeder, Dresden (DE); Martin Knechtel, Dresden (DE)

(73) Assignee: SAP SE, Walldorf (DE)

( * ) Notice: Subject to any disclaimer, the term of this patent is extended or adjusted under 35 U.S.C. 154(b) by 292 days.

(21) Appl. No.: 14/747,070

(22) Filed: Jun. 23, 2015

(65) Prior Publication Data

US 2016/0378327 A1   Dec. 29, 2016

(51) Int. Cl.
*G06F 3/0482* (2013.01)
*G06F 3/0488* (2013.01)
*G06F 3/01* (2006.01)

(52) U.S. Cl.
CPC ........ *G06F 3/04883* (2013.01); *G06F 3/0482* (2013.01); *G06F 3/017* (2013.01)

(58) Field of Classification Search
CPC .... G06F 3/017; G06F 3/0237; G06F 3/04817; G06F 3/0482; G06F 3/04842; G06F 3/04883; G06F 3/04886
See application file for complete search history.

(56) References Cited

U.S. PATENT DOCUMENTS

| | | | | |
|---|---|---|---|---|
| 5,798,760 A | * | 8/1998 | Vayda | G06F 3/0482 715/834 |
| 2007/0168890 A1 | * | 7/2007 | Zhao | G06F 3/04883 715/863 |
| 2007/0236468 A1 | * | 10/2007 | Tuli | G06F 3/038 345/173 |
| 2010/0103178 A1 | * | 4/2010 | Song | G06F 3/03542 345/473 |
| 2011/0260962 A1 | * | 10/2011 | Benko | G06F 3/04883 345/156 |
| 2013/0285898 A1 | * | 10/2013 | Park | G06F 3/017 345/156 |
| 2014/0152594 A1 | * | 6/2014 | Kim | G06F 3/04883 345/173 |
| 2014/0198063 A1 | * | 7/2014 | Kajiya | G06F 3/041 345/173 |

* cited by examiner

*Primary Examiner* — Rinna Yi
(74) *Attorney, Agent, or Firm* — Buckley, Maschoff & Talwalkar LLC

(57) ABSTRACT

A system includes receiving a start of a path gesture and determining, via a processor, a decision point along the path gesture. At the decision point, a first command associated with a first dimension is displayed. In addition, at the decision point, a second command associated with a second dimension is displayed.

22 Claims, 16 Drawing Sheets

PATH GESTURES

BACKGROUND

Software applications that run on desktop computers often utilize dropdown menus for displaying complex lists of items to a user. A dropdown menu allows the user to choose one value from the list. However, when running a desktop software application on a mobile device, such as a tablet or a smart phone, the mobile device's display screen (e.g., a touchscreen) may not be large enough to properly display a dropdown menu without interfering with the software application. For example, a conventional dropdown menu or a nested menu (e.g., list items which themselves contain new dropdown menus) being displayed on a mobile device may be difficult or impossible to scroll through or may clutter the screen to a point that the application is not useable.

Using conventional methods, the implementation of a desktop application on a mobile device requires a reduction in user interface elements such as dropdown menus as well as concealing information in general. While desktop applications often have complex menu structures, because of the available space on a desktop display screen, mobile applications typically hide as much information as possible and only provide details on demand. Therefore, a way to provide a more complex set of functionality on a mobile device, while leaving the mobile screen clean and intuitive, is desirable.

DETAILED DESCRIPTION

The following description is provided to enable any person in the art to make and use the described embodiments. Various modifications, however, will remain readily apparent to those in the art.

The following embodiments relate to path gestures such as, for example, multi-step swipe gestures that may be performed by a user. The multi-step swipe gestures may project actions, from a complex menu structure, into path gestures which may then be attached to an application. The path gestures may be based on a path gesture mapping. For example, after the completion of a single step (e.g., a single swipe), the user may be offered a new set of actions/commands which may be triggered by continuing with another swipe (or a different type of gesture) into a specific direction based on the mapping. Each different direction may be associated with a different dimension (e.g., an X dimension and a Y dimension) such as the dimensions of a Cartesian coordinate system. The present embodiments may provide a complex set of menu functionality to mobile applications while leaving a mobile screen clean and intuitive. While a visual implementation of the present embodiments is illustrated using X and Y dimensions, the visual implementation of the present embodiments is not limited to an X and Y axis. In some embodiments, the visual implementation may vary as long as navigation options are displayed to the user in an easily distinguishable manner. For example, the visual implementation may comprise a popup from a context click or may be shaped like a circle that illustrates more than three options (e.g., five options).

Figure 1:
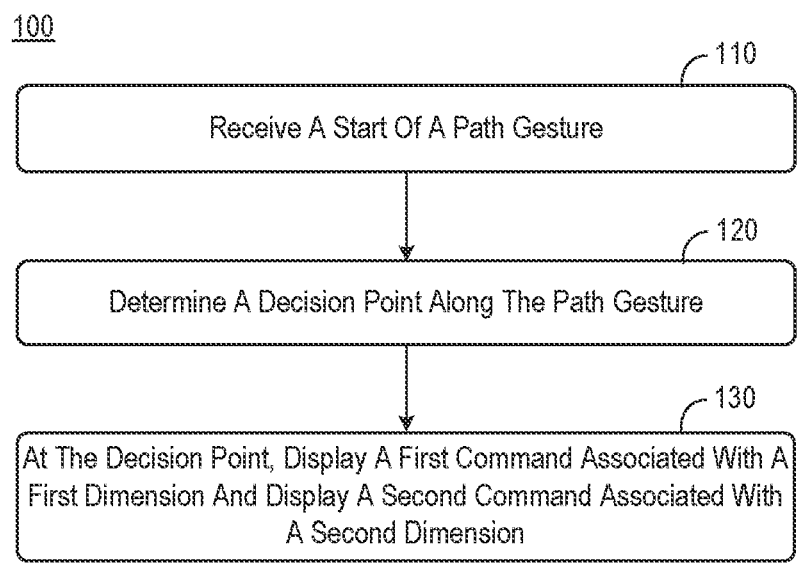
FIG. 1 illustrates a method according to some embodiments.

Now referring to FIG. 1, a method 100 is illustrated according to some embodiments. At 110, a start of a path gesture is received. The path gesture may comprise a touch screen gesture such as, but not limited to, a swipe, drag, or touch. The path gesture may be performed using a stylus or via a user's finger. The start of a path gesture may also be referred to a trigger gesture or a first gesture that triggers the use of a path gesture mapping. The start of a gesture may comprise a placement of a finger or a stylus on a touch screen or, in some embodiments, the start of a gesture may comprise an initial movement of a finger or stylus on a touchscreen. For example, the start of the gesture may comprise movement of a user's finger in contact with a display screen. Or, in other words, movement of a user's finger in contact with a display screen, such as a touch screen, may trigger a start of the path gesture.

Figure 2:
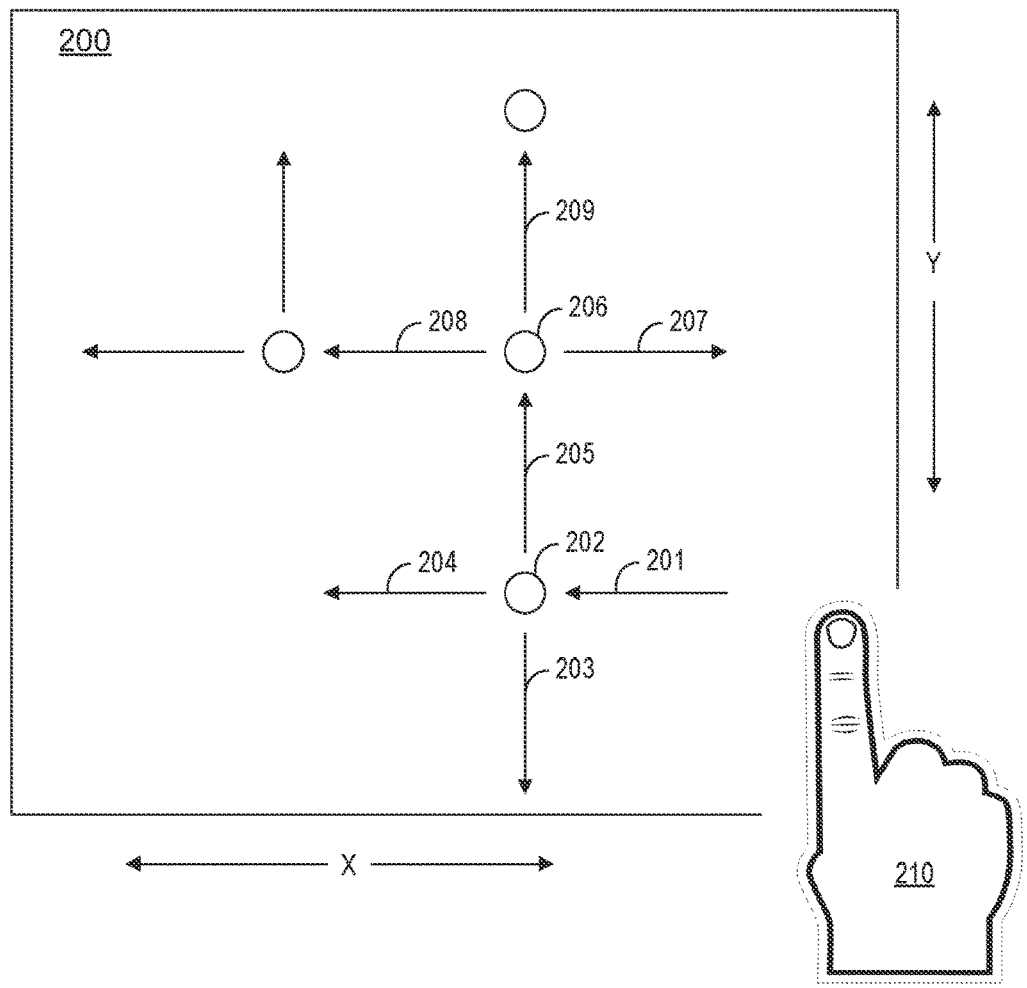
FIG. 2 illustrates a path gesture mapping according to some embodiments.

Now referring to FIG. 2, an embodiment of a path gesture mapping is illustrated. The path gesture may comprise a plurality of paths and decision points. FIG. 2 may also illustrate a touchscreen 200 that may function as an input device layered on a top of an electronic visual display of a mobile device, such as, but not limited to a tablet or a smart phone. A user may provide input, or control the mobile device, through simple or multi-touch gestures by touching the touchscreen 200 with a stylus, pen and-or one or more fingers. In the present example, a finger 210 may move in a leftward fashion along direction 201. The movement along direction 201 may comprise a trigger gesture and may indicate a start of the path gesture.

Referring back to FIG. 1, at 120 a decision point along the path gesture is determined. The decision point may comprise a point along the path gesture which may indicate a set of actions that may be executed and the set of actions are to be displayed to a user. Determining the decision point may be based on a distance that a finger travels along a path. For example, in a case that the path gesture comprises a one-dimensional path (e.g., a straight path or a path in a single direction), the decision point may comprise a midpoint of the path gesture along the one-dimensional path. Referring again to FIG. 2, a decision point 202 may be determined when the finger 210 travels path 201 and reaches point 202 which may comprise a midpoint between path 201 and path 204 (e.g., a point between two segments of a path gesture).

In other embodiments, and in a case where the path gesture comprises a two-dimensional path (e.g., having two different directions such as, but not limited to, (i) up-down and (ii) right-left), the decision point may comprise a point where the path gesture changes from a first dimension/direction to a second dimension/direction (e.g., a point where a path changes from a X-axis to a Y-axis) such as from a left-right direction to a up-down direction. For example, a decision point 202 may be determined when the finger 210 travels path 201 and reaches point 202 where there is a possibility to change direction to either paths 203 or paths 205. Path 201 may be perpendicular to path 205.

At 130, a first command associated with a first dimension and a second command associated with a second dimension are displayed at the decision point. For example, when a user's finger or stylus reaches the decision point, a first command and a second command are displayed to the user. The first command may relate to a potential movement of the user's finger or stylus in an X axis and the second command may relate to a potential movement of the user's finger or stylus in a Y axis (e.g., a first dimension and a second dimension). For each dimension, besides the first dimension, at least two commands may always be displayed. For example, in some embodiments a first command may be reached by moving up a dimension's axis, and a second command may be reached by moving down the dimension's axis.

Referring again to FIG. 2, at decision point 202 a user may be presented with a plurality of command options. For example, the user may be presented with a command associated with path 203, a command associated with path 204 and a command associated with path 205. In this case, if the user moves his finger along path 203, the command associated with path 203 may be executed. Path 203 may be associated with movement in a Y axis. Similarly, if the user moves his finger along path 204, then the command associated with path 204 may be executed. Path 204 may be associated with movement in an X axis.

In the illustrated embodiment, if the user's finger moves along path 205, the user's finger may reach a second decision point 206 and may be presented with options or commands related to paths 207, 208 and 209.

For illustrative purposes, and to aid in understanding features of the specification, some examples will now be introduced. These examples are not intended to limit the scope of the claims. The examples relate to managing of a list of email items. However, the aforementioned method may also be associated with formatting text or many other applications.

Figure 3:
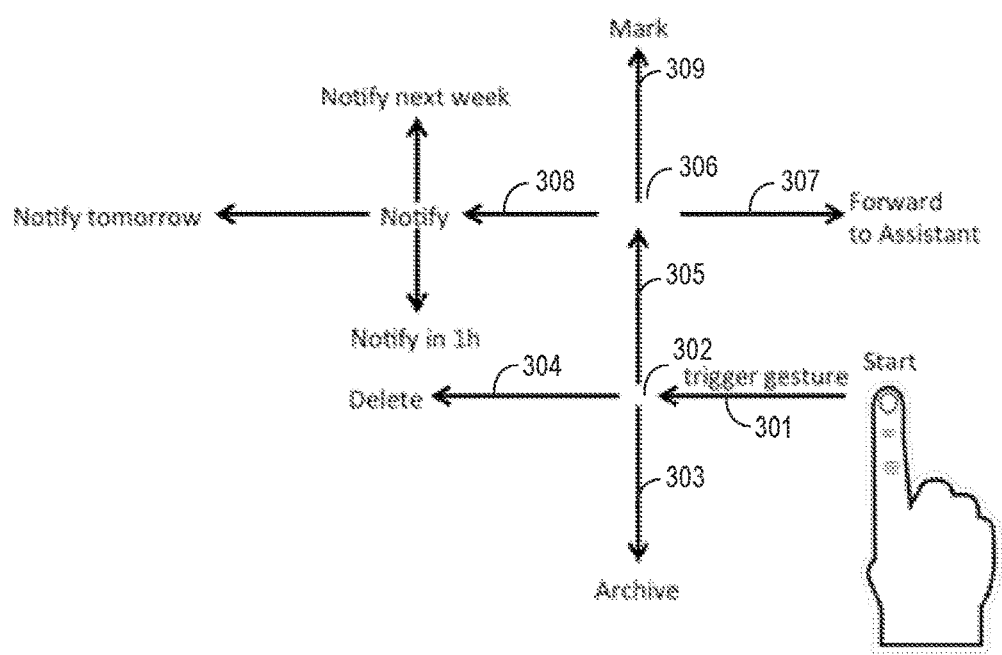
FIG. 3 illustrates a path gesture mapping according to some embodiments.

Now referring to FIG. 3, FIG. 4, FIG. 5, FIG. 6, FIG. 7, FIG. 8, FIG. 9, FIG. 10, FIG. 11, FIG. 12, FIG. 13, FIG. 14, and FIG. 15, an embodiment of a touchscreen 300 and a mapping of its associated path gestures are illustrated. FIG. 3 illustrates path 301 (an initial trigger gesture), an archive path 303, a delete path 304, a progress path 305, a forward to assistant path 307, a notify path 308, and a mark path 309. FIG. 3 also illustrates decision points 302 and 306. FIG. 3 may illustrate a path gesture mapping.

Figure 4:
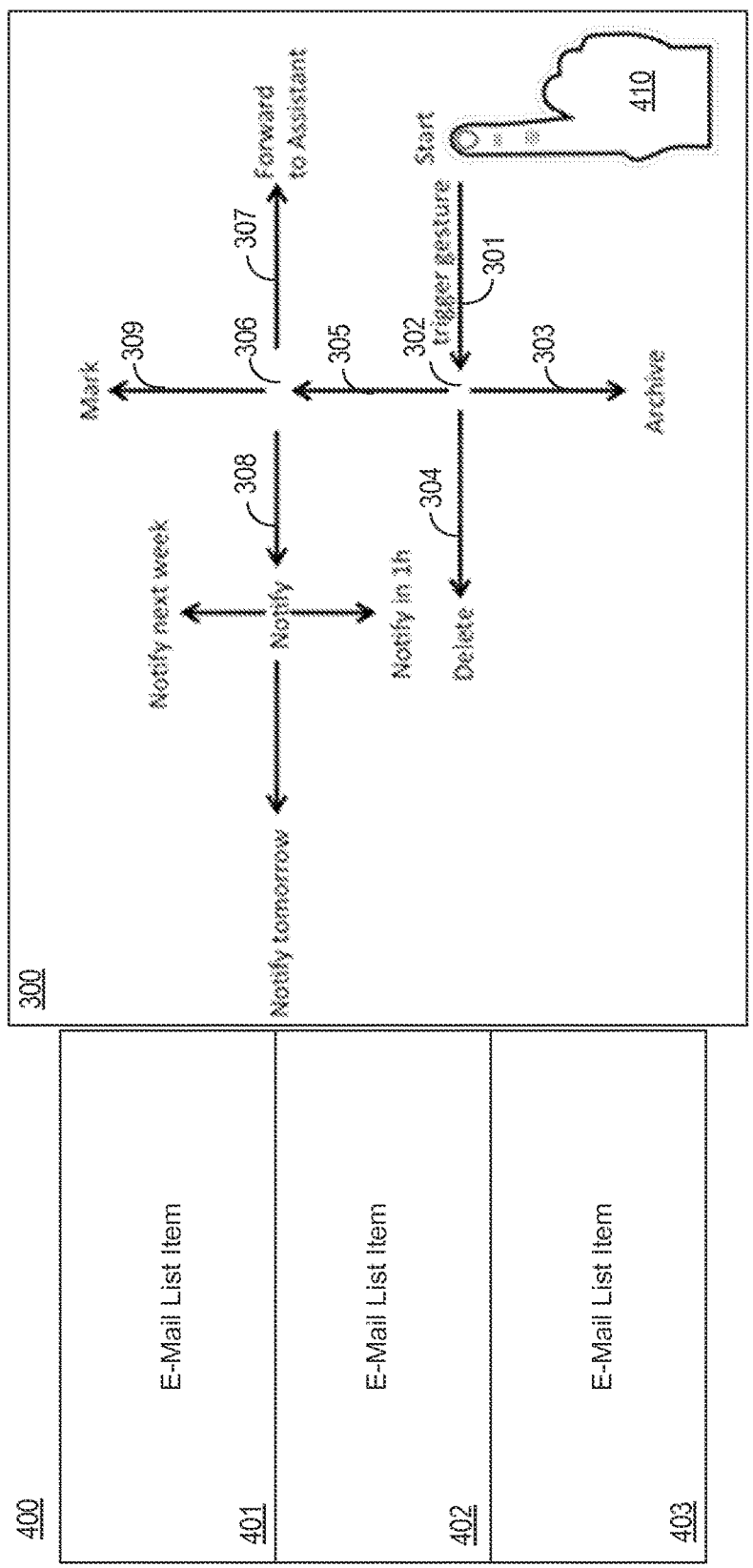
FIG. 4 illustrates a correlation between a user menu and a path gesture according to some embodiments.

Referring now to FIG. 4, an embodiment of the touchscreen 300 is illustrated alongside a list 400 of email items 401, 402 and 403. The present examples relate to email item 402 being a target of a command executed by a user through the use of a path gesture. A pointer 410 (such as a finger or a stylus) moves along path 301 to initiate/trigger a path gesture. A user may view a visual transformation of action items/commands based on the user's movement along a path gesture. During a user's movement along a path gesture, an action item, which the user's movement is heading toward, may increase in size thus displacing other elements. Furthermore, if the user completes one step (e.g., a single swipe), an extending action may snap, showing that the system has "locked" it as current selection. If not yet snapped, the user may reverse his last swipe falling back to a last set of actions. For example, once a user's finger reaches a decision point, a menu associated with accessible commands may be locked at the decision point. The user may then perform a second single swipe to move to a command or a second decision point.

Figure 5:
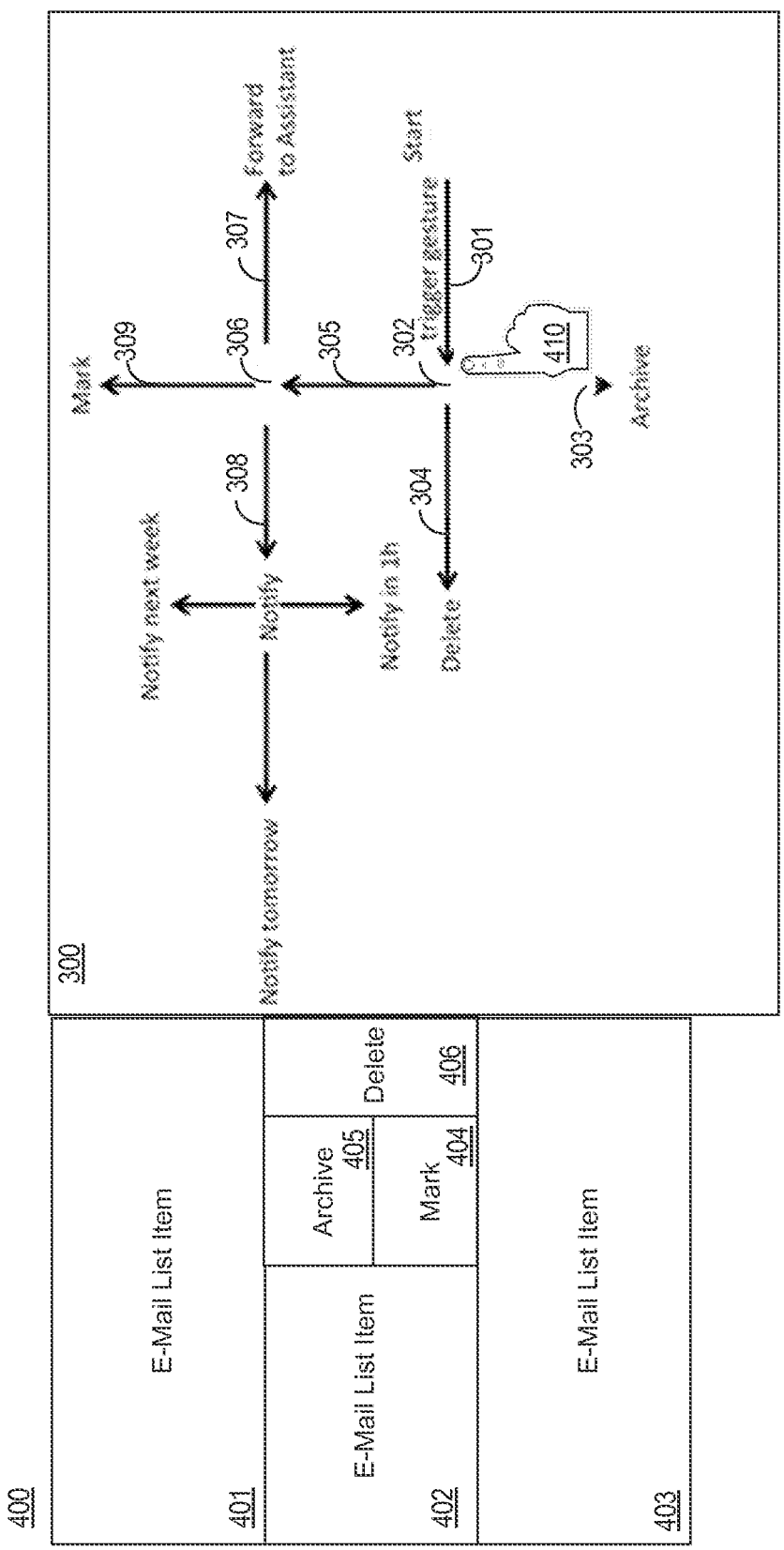
FIG. 5 illustrates a correlation between a user menu and a path gesture according to some embodiments.
Figure 6:
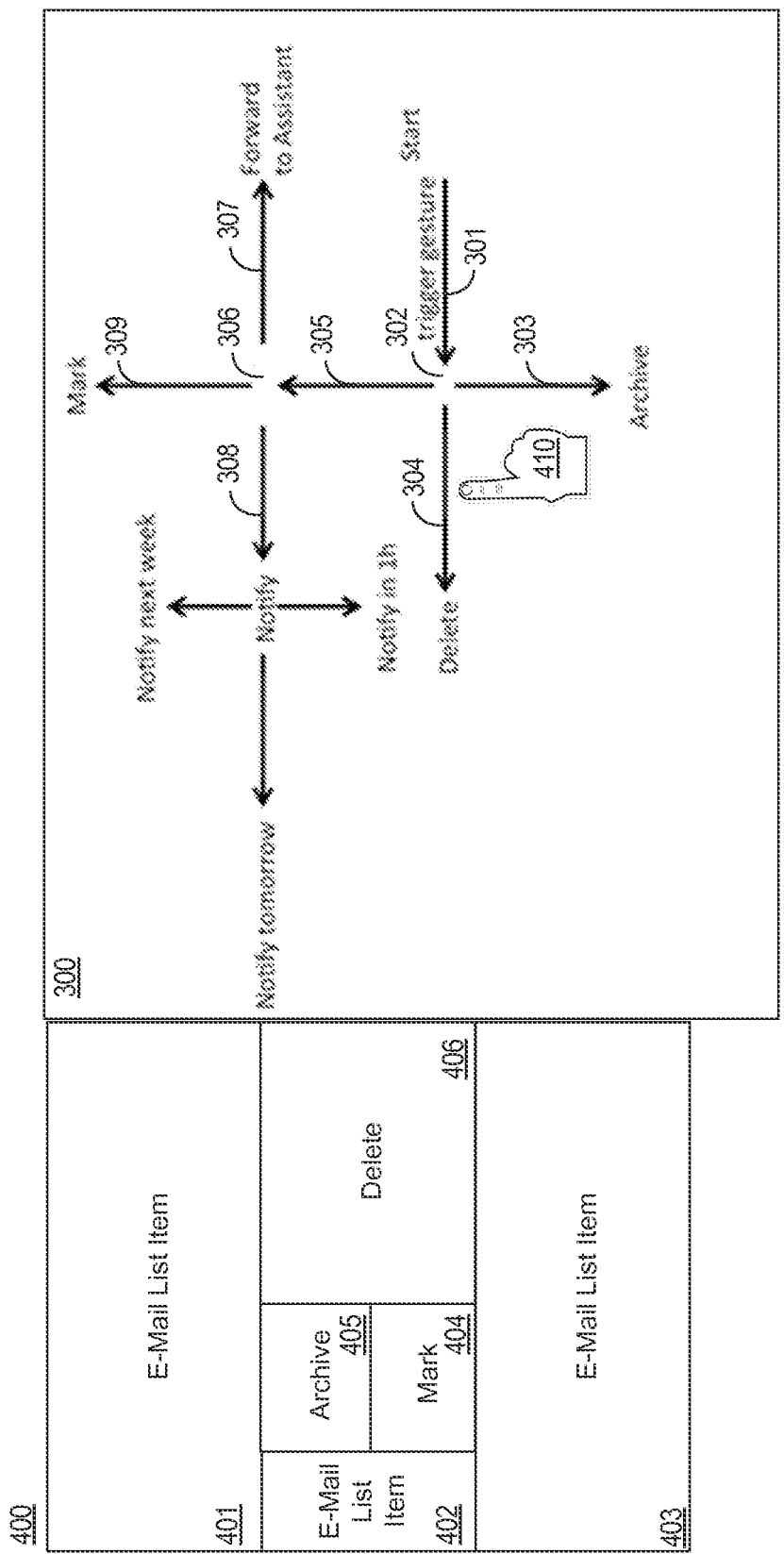
FIG. 6 illustrates a correlation between a user menu and a path gesture according to some embodiments.
Figure 7:
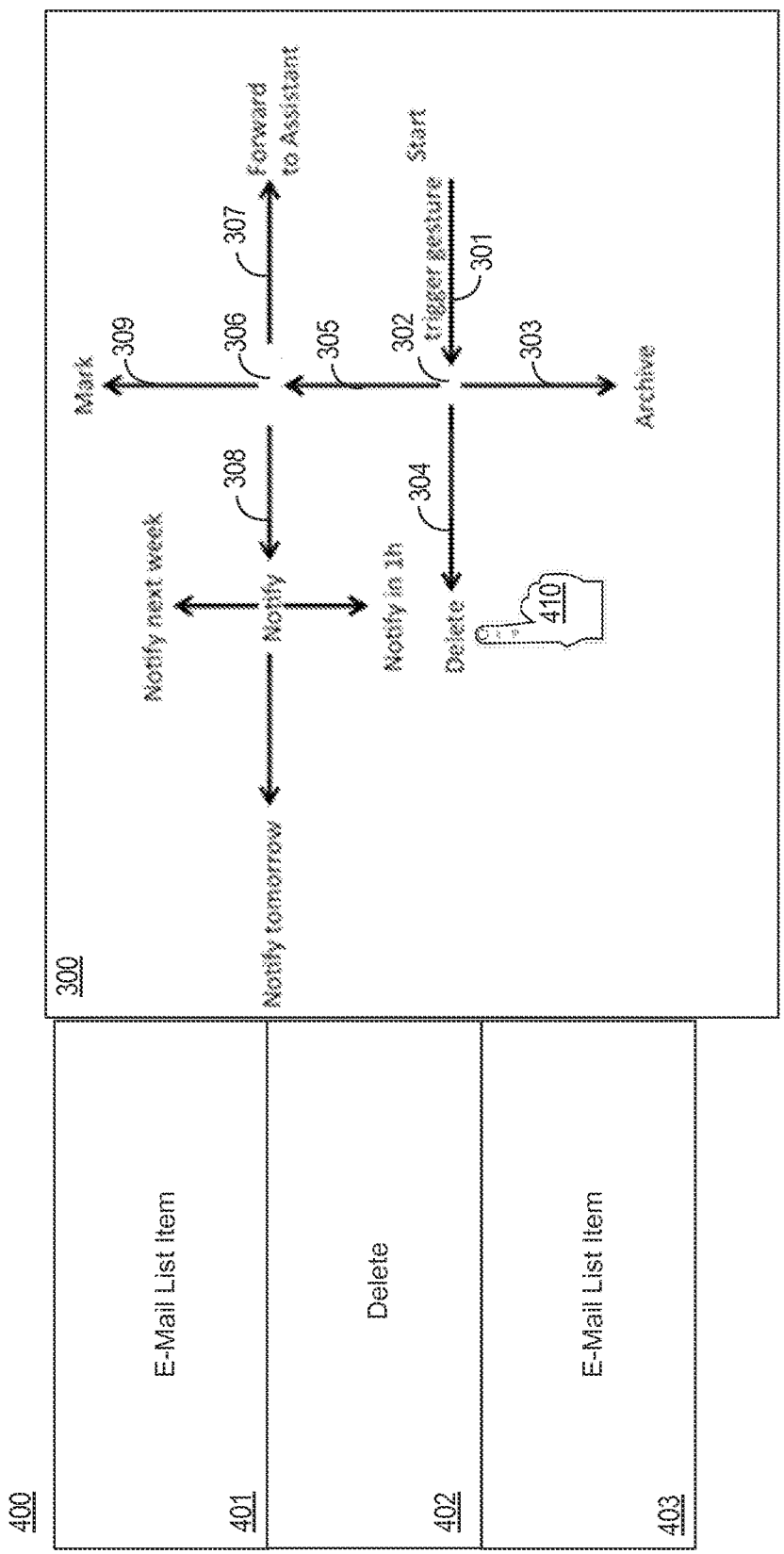
FIG. 7 illustrates a correlation between a user menu and a path gesture according to some embodiments.

For a first example, and now referring to FIG. 5, FIG. 6 and FIG. 7, a selected email item may be deleted. As illustrated in FIG. 5, when the pointer 410 moves to decision point 302, a menu associated with email item 402 may appear to the user where the menu may indicate the possible choices/command that the pointer 410 can move to from the decision point 302 (e.g., mark 404 which is associated with path 305, archive 405 which is associated with path 303 and delete 406 which is associated with path 304).

Now referring to FIG. 6, as illustrated, the pointer 410 has moved further down path 304 and, in response to moving further down path 304, the user menu associated with email item 402 now illustrates the delete command 406 more prominently than archive command 405 and the mark command 404. Once the pointer 410 reaches a distance associated with the delete command at FIG. 7, the delete command may be executed and the email list item 402 may be illustrated as delete (or deleted).

Figure 8:
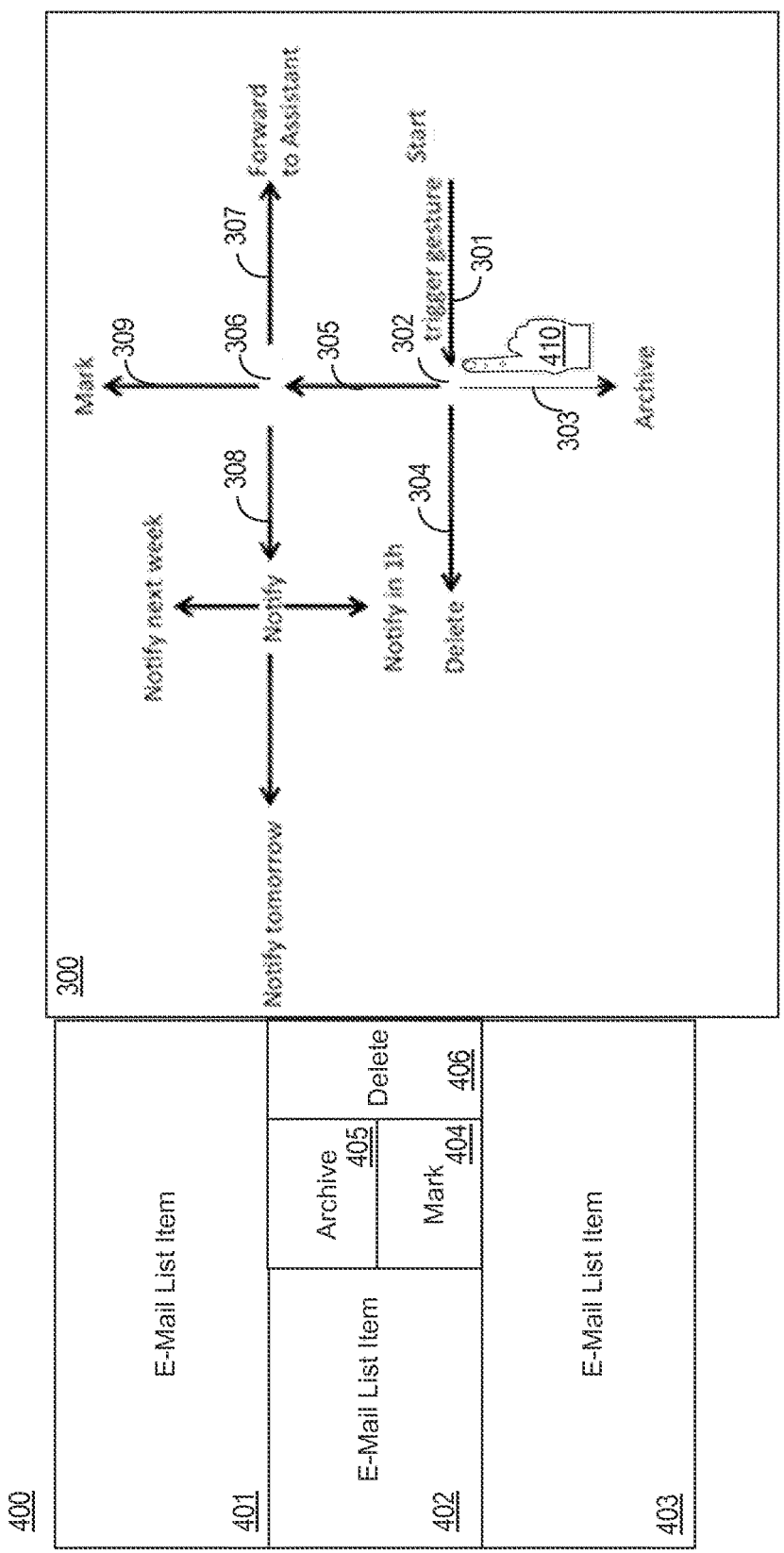
FIG. 8 illustrates a correlation between a user menu and a path gesture according to some embodiments.
Figure 9:
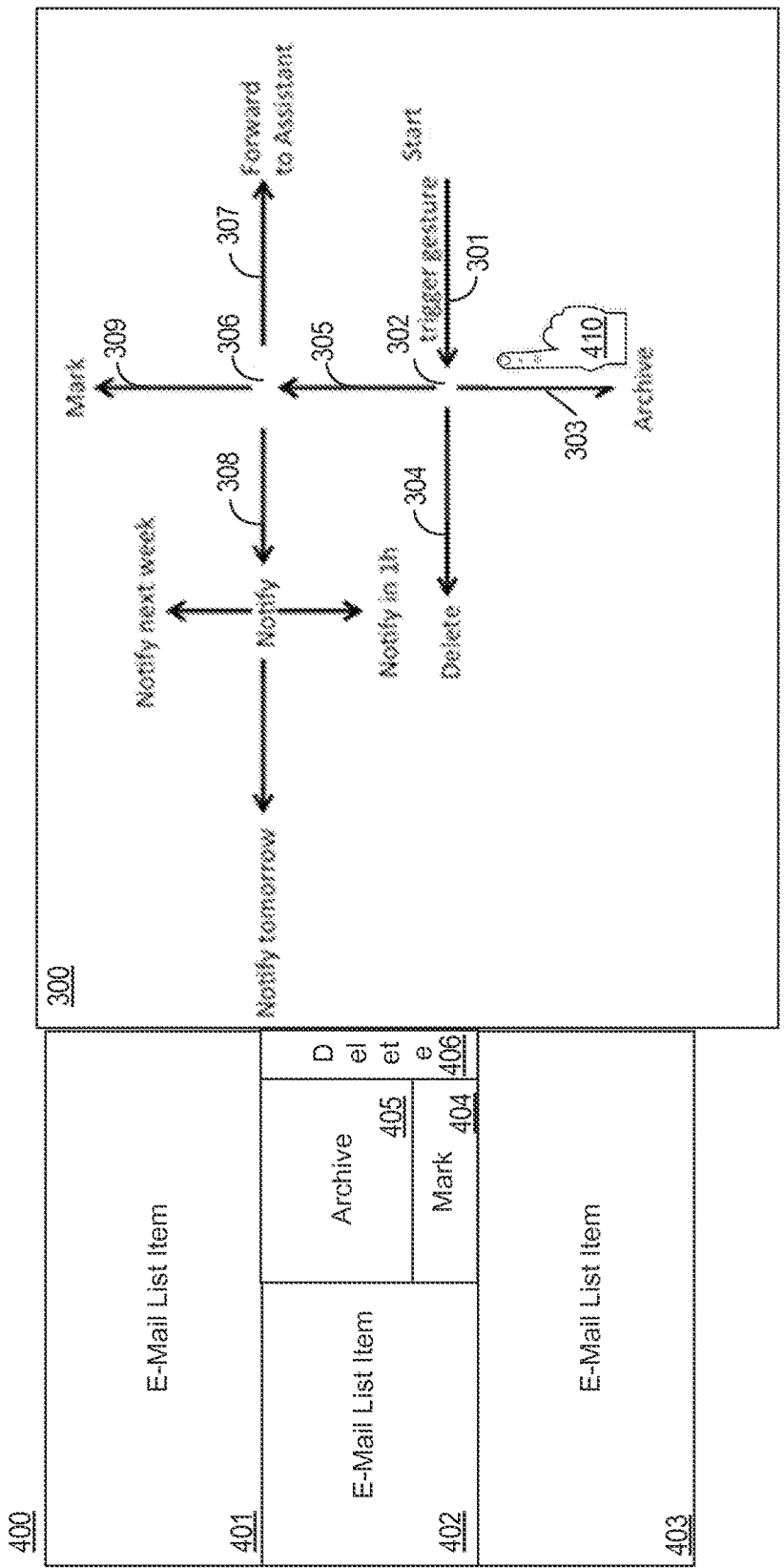
FIG. 9 illustrates a correlation between a user menu and a path gesture according to some embodiments.
Figure 10:
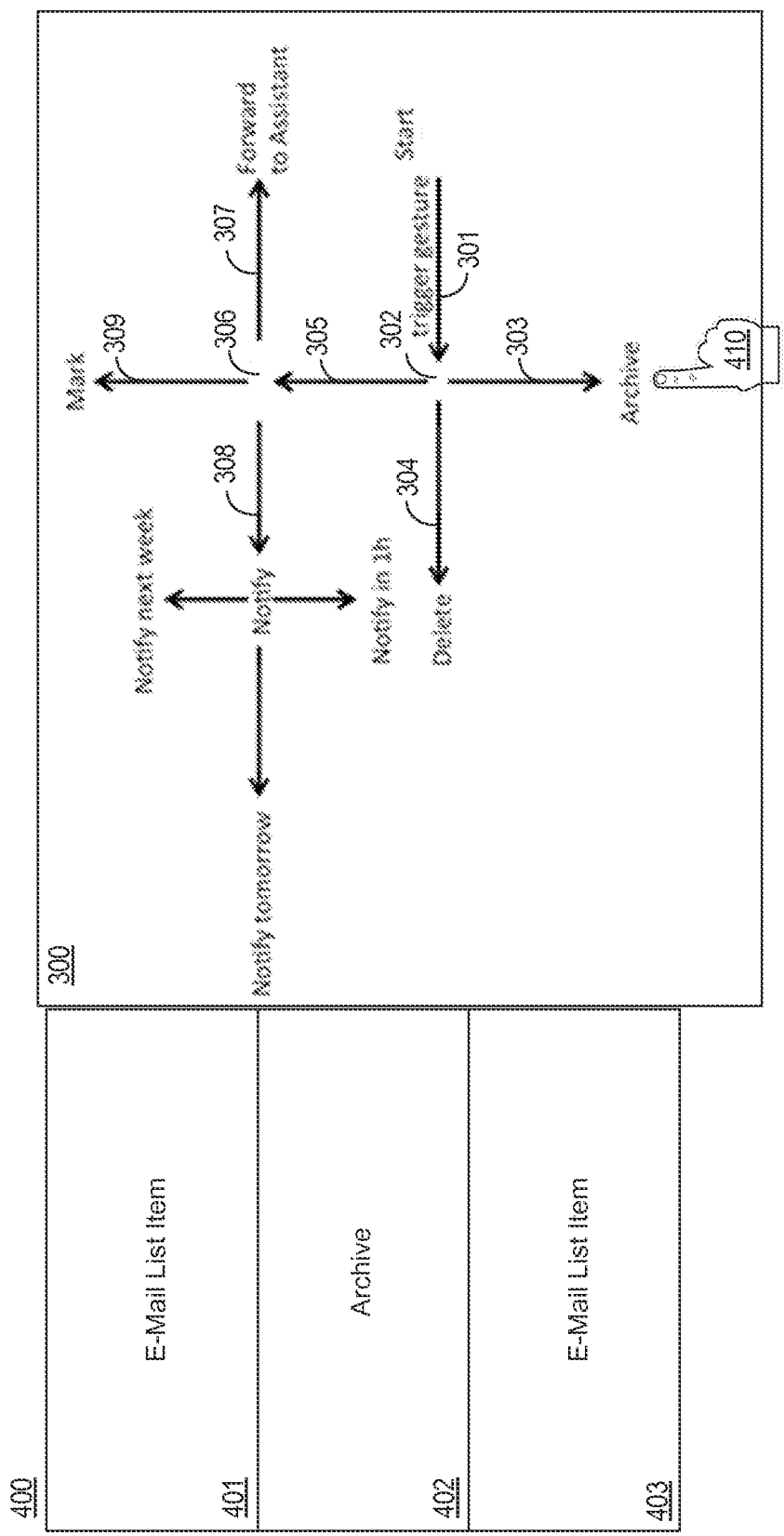
FIG. 10 illustrates a correlation between a user menu and a path gesture according to some embodiments.

For a second example, and now referring to FIG. 8, FIG. 9 and FIG. 10 a selected email item may be archived. As illustrated in FIG. 8, when the pointer 410 moves to decision point 302, a menu associated with email item 402 may appear to the user where the menu may indicate the possible choices/commands that the pointer 410 can move to from the decision point 302 (e.g., mark 404 which is associated with path 305, archive 405 which is associated with path 303 and delete 406 which is associated with path 304).

Now referring to FIG. 9, the pointer 410 has moved further down path 303 and, in response to moving further down path 303, the user menu associated with email item 402 now illustrates the archive command 405 more prominently than the delete command 406 and the mark command 404. Once the pointer 410 reaches a distance associated with the archive command at FIG. 10, the archive command may be executed and the email list item 402 may be illustrated as archive (or archived).

Figure 11:
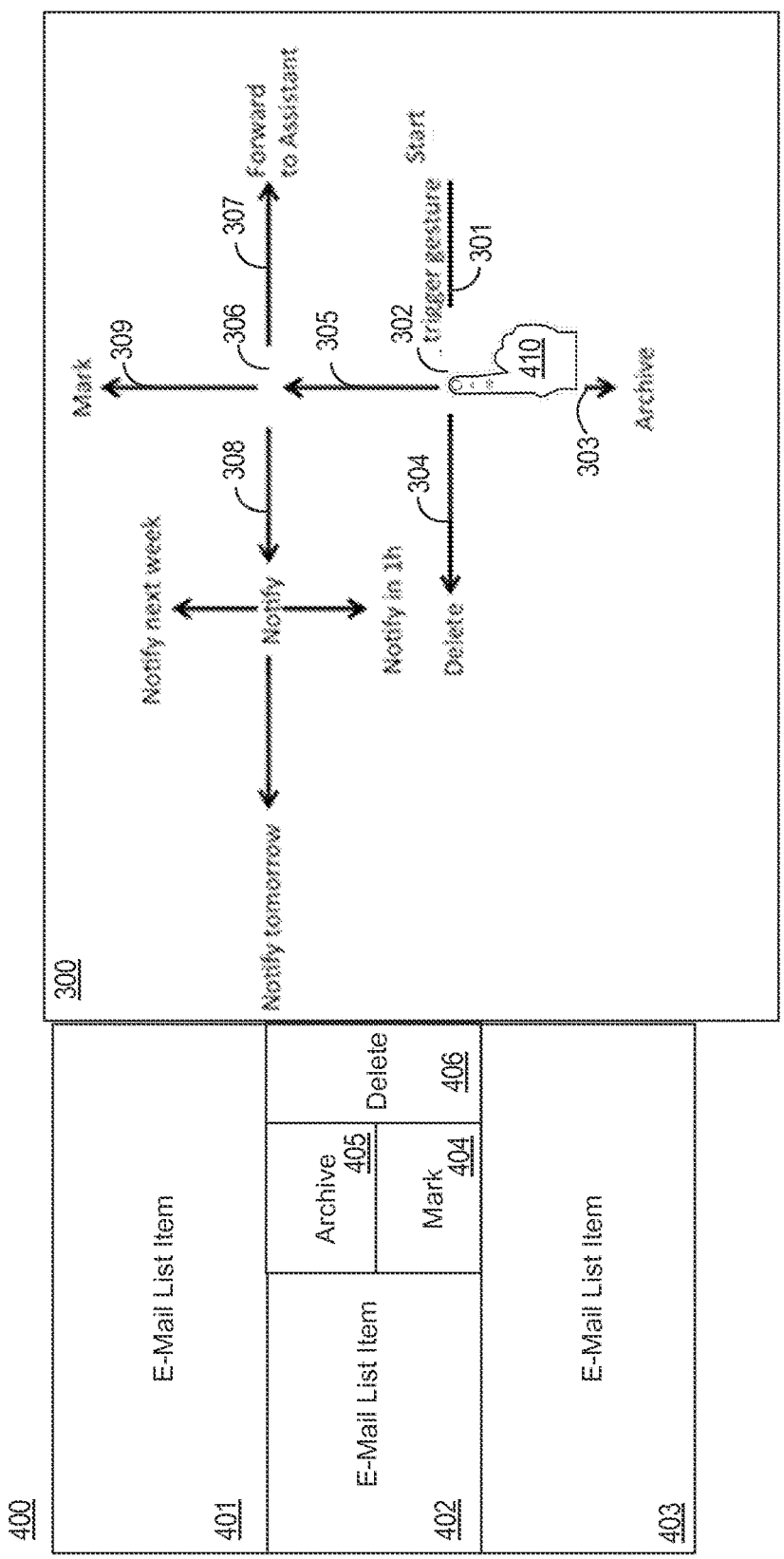
FIG. 11 illustrates a correlation between a user menu and a path gesture according to some embodiments.

For a third example, and now referring to FIG. 11, FIG. 12, FIG. 13, FIG. 14 and FIG. 15, a selected email item may be marked (e.g., marked as read, marked as unread, etc.). As illustrated in FIG. 11, when the pointer 410 moves to decision point 302, a menu associated with email item 402 may appear to the user where the menu may indicate the possible choices/commands that the pointer 410 can move to from the decision point 302 (e.g., mark 404 which is associated with path 305, archive 405 which is associated with path 303 and delete 406 which is associated with path 304).

Figure 12:
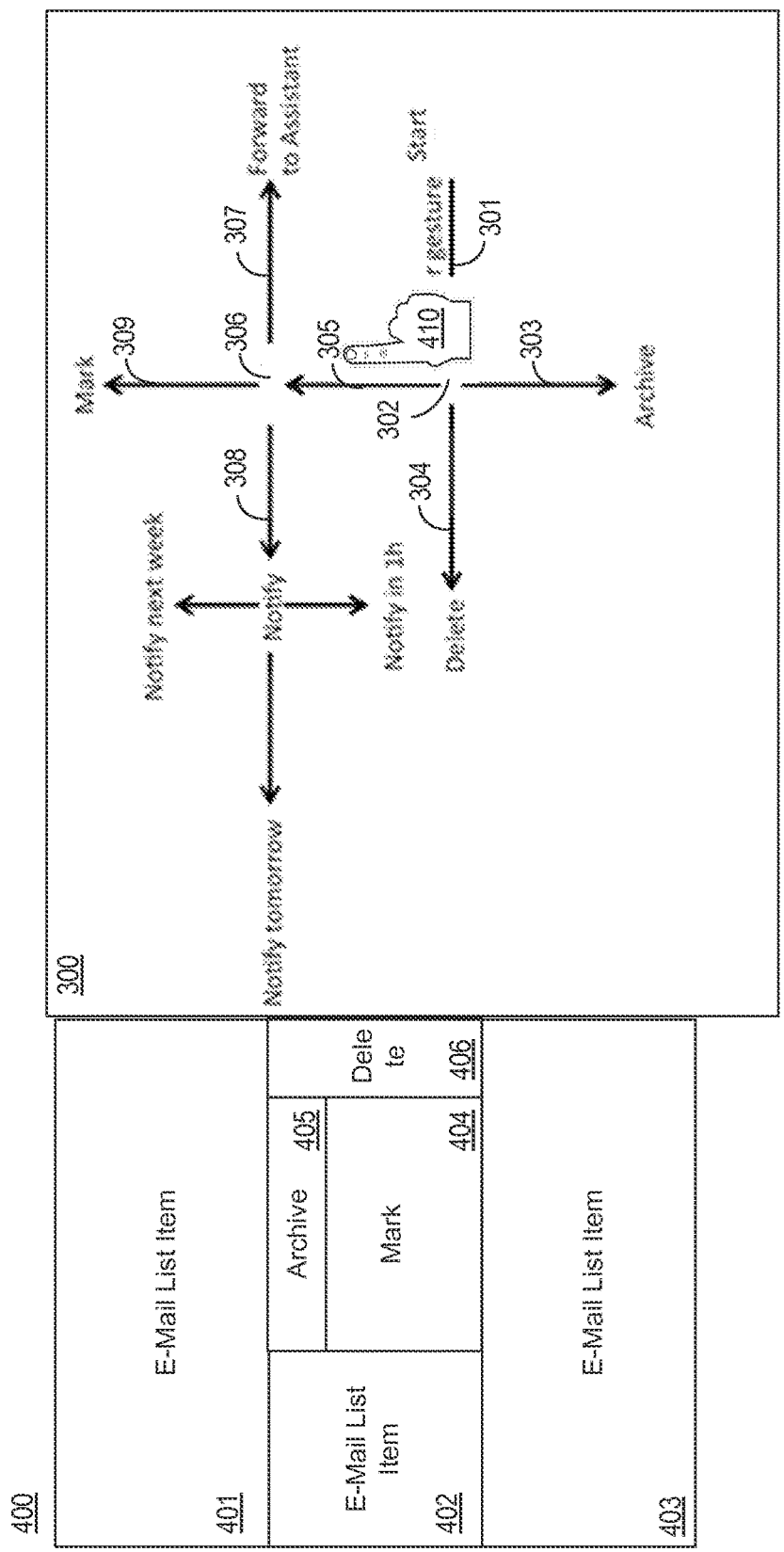
FIG. 12 illustrates a correlation between a user menu and a path gesture according to some embodiments.
Figure 13:
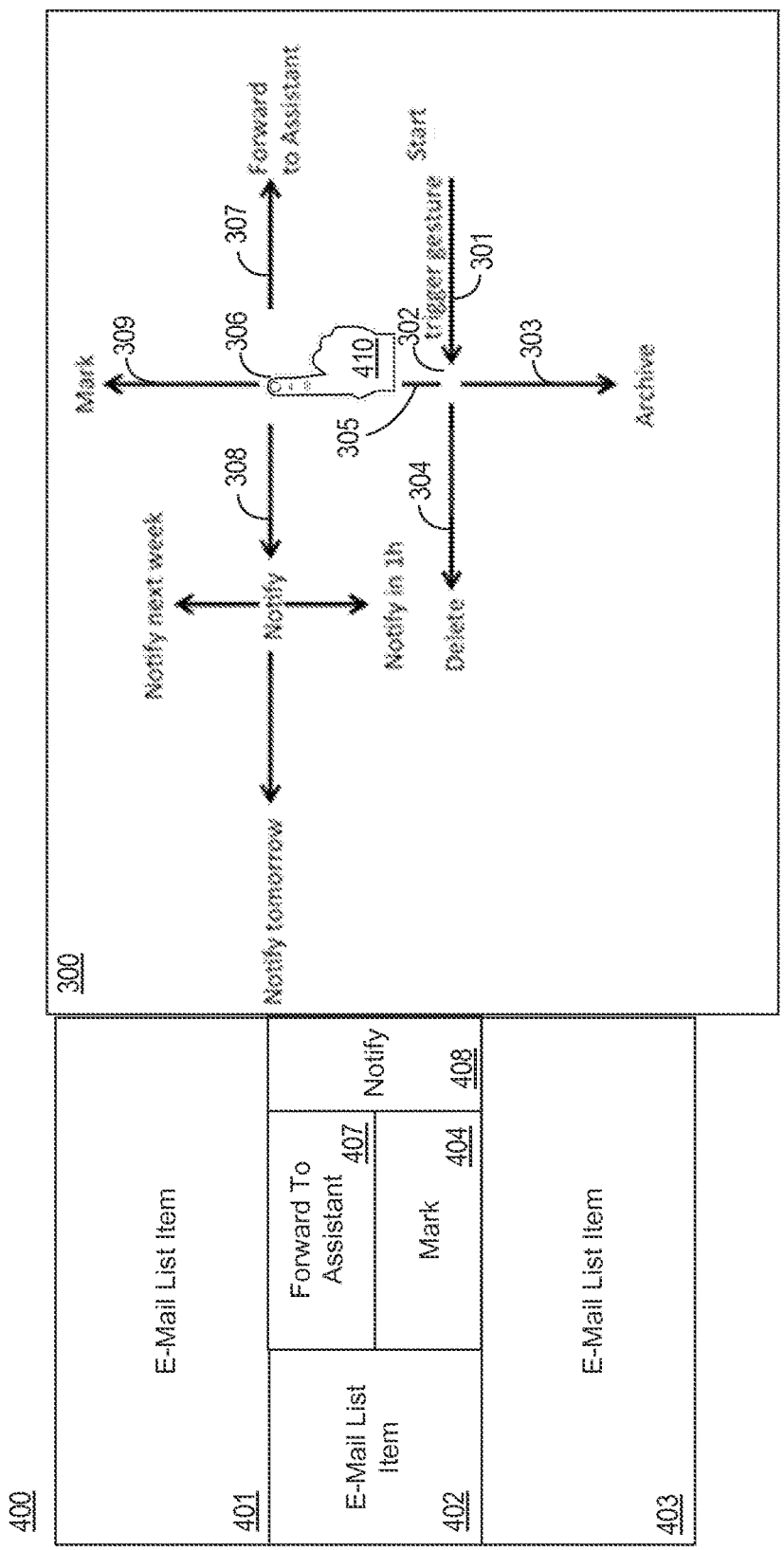
FIG. 13 illustrates a correlation between a user menu and a path gesture according to some embodiments.
Figure 14:
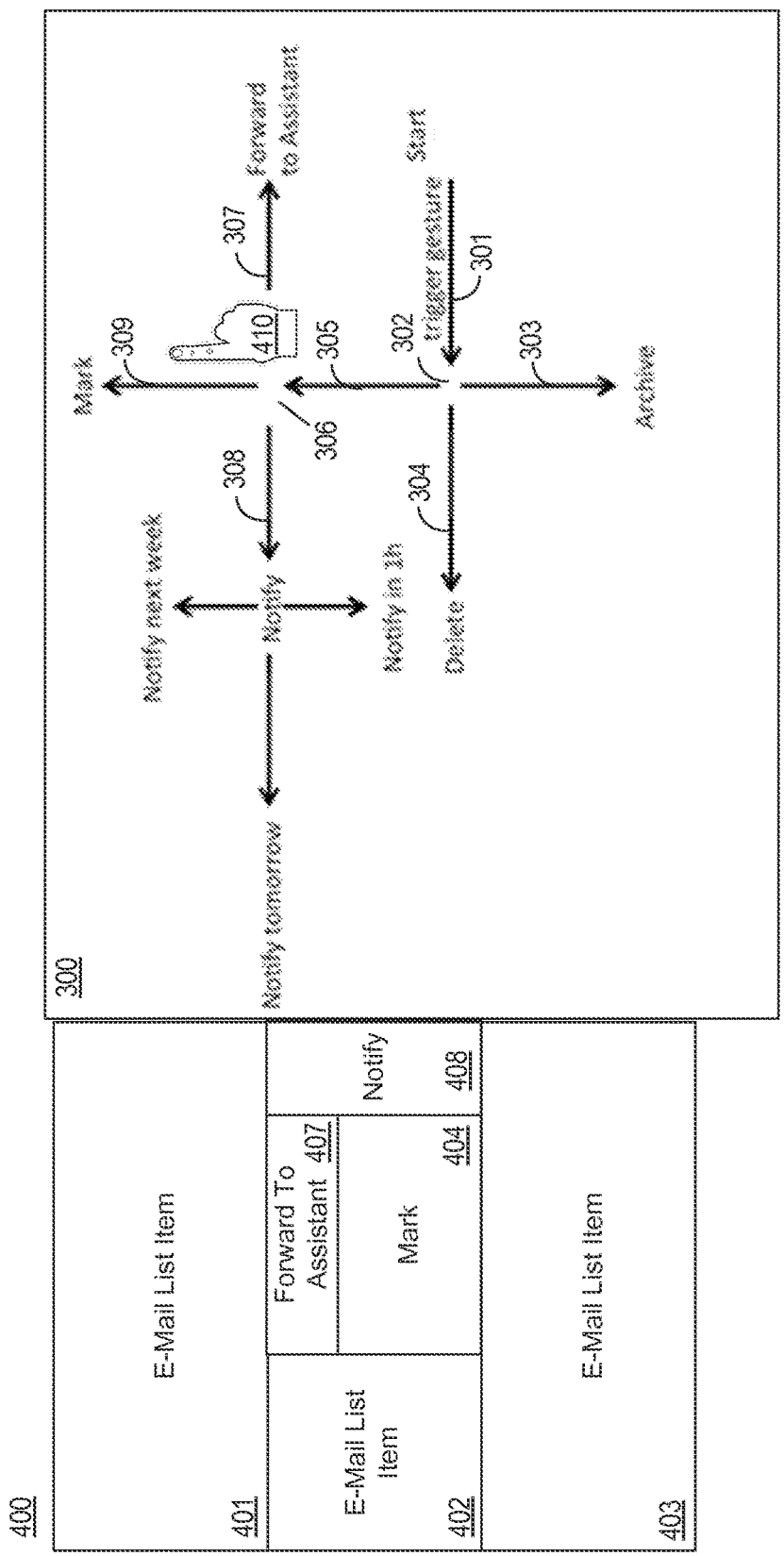
FIG. 14 illustrates a correlation between a user menu and a path gesture according to some embodiments.

Now referring to FIG. 12, the pointer 410 has moved further down path 305 and in response to moving further down path 305, the user menu now illustrates the mark 404 command more prominently than delete 406 and archive 405. Once the pointer reaches decision point 306, at FIG. 13, a menu associated with email item 402 may appear to the user where the menu may indicate the possible choices/ commands that the pointer 410 can move to from the decision point 306 (e.g., mark 404 which is associated with path 309, forward to assistant 407 which is associated with path 307 and notify 408 which is associated with path 308). Now referring to FIG. 14, the pointer 410 has moved further down path 309 and, in response to moving further down path 309, the user menu now illustrates the mark command 404 more prominently than the forward to assistant command 407 and the command notify 408.

Figure 15:
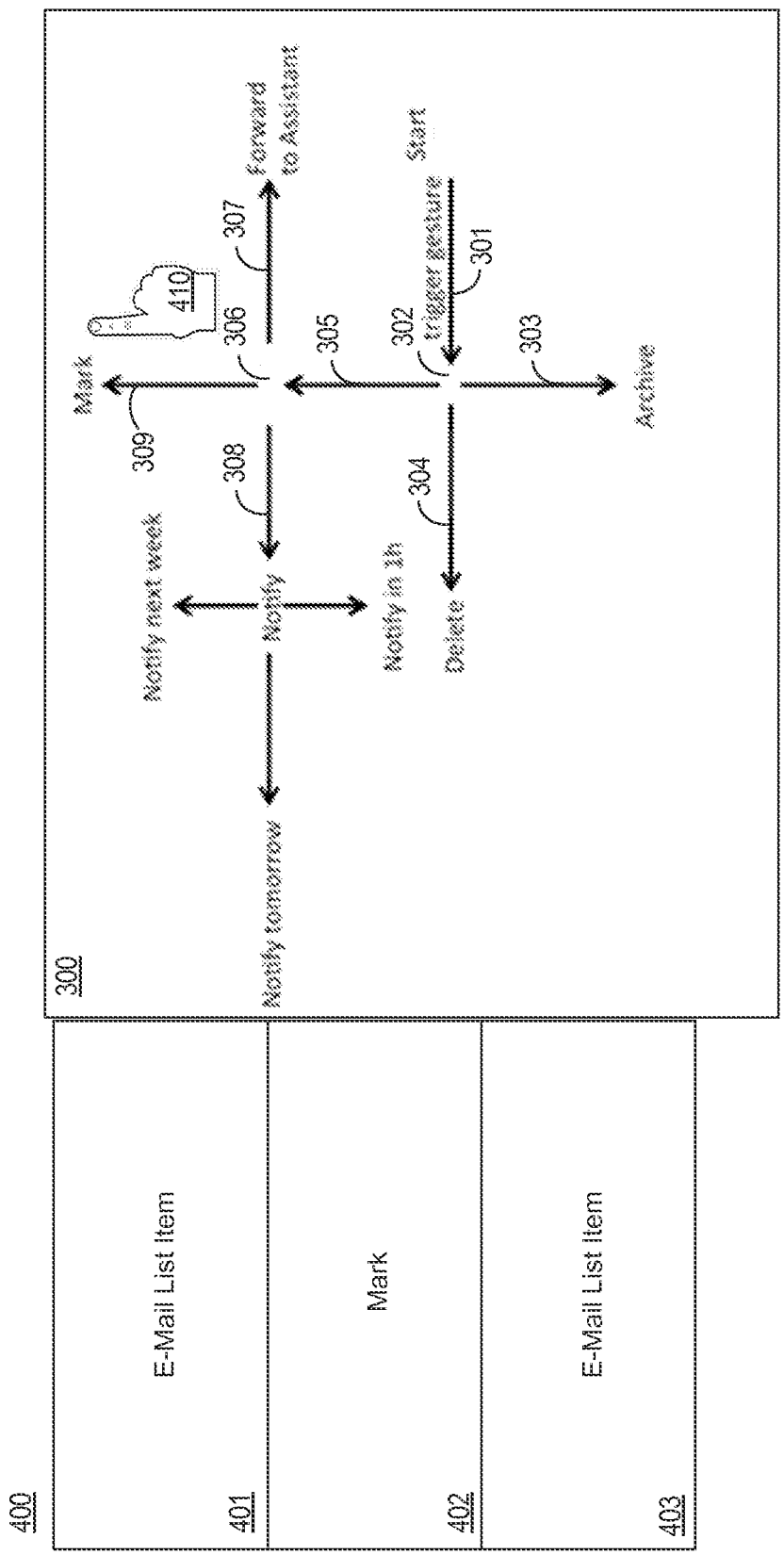
FIG. 15 illustrates a correlation between a user menu and a path gesture according to some embodiments.

Once the pointer 410 reaches a distance associated with the mark command at FIG. 15, the mark command may be executed and the email list item 402 may be illustrated as mark (or marked). In some embodiments, the pointer may not need to reach the distance associated with the mark command (e.g., the user does not need to finish the swipe that reaches a command). In this embodiment, a snap mechanism may be employed. For example, in a case that the user moved the pointer half way to the decision point (e.g., 50% of total distance) the commands available from the decision point may be displayed. In a case that the user keeps moving the pointer from the 50% point toward an end (e.g., a 100% point) the command may be snapped to (e.g., snapping to 100%) once the pointer passes the 75% mark because the pointer is now closer to the command than to the decision point.

In an alternate embodiment, a determination of a screen size may determine a number or menu items or size of a path gesture menu that may be used. For example, a smaller screen may only utilize two or three levels of commands in an X and a Y direction. However, with a larger touchscreen four or five levels of commands may be utilized. In some embodiments, a path gesture may comprise both an X and a Y component (e.g., a Cartesian coordinate system). Commands may be prioritized based on an amount of available screen size and commands may be clustered into minimal logical subsets. For example, in the case of font editing, commands may be clustered based on (i) Style (e.g., bold, underline, italics), (ii) color (e.g., red, black, blue) and (iii) effects (e.g., lower case, all caps).

Figure 16:
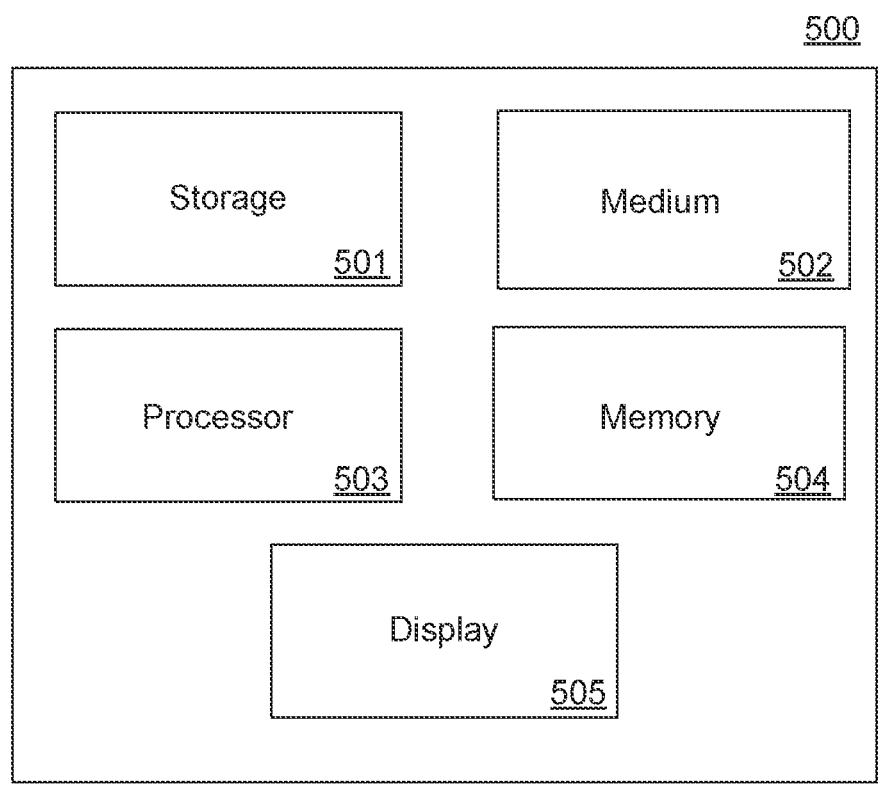
FIG. 16 illustrates an apparatus according to some embodiments.

Now referring to FIG. 16, an embodiment of an apparatus 500 is illustrated. The apparatus 500 may comprise a mobile device. The apparatus 500 may comprise a storage device 501, a medium 502, a processor 503, a main memory 504 and a display 505. According to some embodiments, the apparatus 500 may further comprise a digital display port, such as a port adapted to be coupled to a digital computer monitor, television, portable display screen, or the like.

The main memory 502 may comprise any type of memory for storing data, such as, but not limited to, a Secure Digital (SD) card, a micro SD card, a Single Data Rate Random Access Memory (SDR-RAM), a Double Data Rate Random Access Memory (DDR-RAM), or a Programmable Read Only Memory (PROM). The main memory 502 may comprise a plurality of memory modules.

The processor 503 may include or otherwise be associated with dedicated registers, stacks, queues, etc. that are used to execute program code and/or one or more of these elements may be shared there between. In some embodiments, the processor 503 may comprise an integrated circuit. In some embodiments, the processor 503 may comprise circuitry to perform a method such as, but not limited to, the method described with respect to FIG. 1.

The processor 503 communicates with the storage device 501. The storage device 501 may comprise any appropriate information storage device, including combinations of magnetic storage devices (e.g., a hard disk drive), optical storage devices, and/or semiconductor memory devices. The storage device 501 stores a program for controlling the processor 503. The processor 503 performs instructions of the program, and thereby operates in accordance with any of the embodiments described herein. For example, the processor 503 may determine positions of a pointer associated with a gesture and execute a command associated with the gesture.

The medium 502 may comprise any computer-readable medium that may store processor-executable instructions to be executed by the processor 503. For example, the medium 502 may comprise a non-transitory tangible medium such as, but is not limited to, a compact disk, a digital video disk, flash memory, optical storage, random access memory, read only memory, or magnetic media. The display 505 may comprise a touchscreen that comprises an input device layered on the top of an electronic visual display.

As used herein, information may be "received" by or "transmitted" to, for example: (i) the apparatus 500 from another device; or (ii) a software application or module within the apparatus 500 from another software application, module, or any other source.

In some embodiments, the storage device 501 stores a database (e.g., including information associated with path gesture mappings and associated commands.). Moreover, various databases might be split or combined in accordance with any of the embodiments described herein.

Embodiments described herein are solely for the purpose of illustration. Those in the art will recognize other embodiments may be practiced with modifications and alterations to that described above.

What is claimed is:

1. A system comprising:
   a processor;
   a display screen comprising a touchscreen layered on a top of an electronic visual display of a device;
   a non-transitory computer-readable medium storing processor-executable process steps executable by the processor to cause the system to:
   display a user interface of an application comprising a plurality of items;
   receive a start of a path gesture on the touchscreen comprising a first swipe, wherein the path gesture comprises a straight path;
   determine, via the processor, a first decision point located at a point along the path gesture, where the path gesture changes from a first direction to a second direction;
   lock, on the electronic visual display, a menu associated with the first decision point when a pointer reaches the first decision point;
   at the first decision point, display the menu comprising at least two commands associated with the plurality of items of the application displayed on the user interface, wherein a first command indicates a potential movement of the pointer in a first direction and display a second command indicates a potential movement of the pointer in a second direction so that a user can move the pointer from the first decision point to one of the commands or a second decision point, wherein the first direction is perpendicular to the second direction; and
   receive, on the touchscreen, a second swipe associated with the path gesture in the second direction to execute the second command on a selected item of the plurality of items of the application; and
   in response to moving the pointer further down to a path of the second swipe from the first decision point, the selected item of the plurality of items of the application associated with the second command is indicated more prominently than other items of the application associated with other commands.

2. The system of claim 1, wherein the start of the path gesture comprises movement of a pointer in contact with the touchscreen of the display screen.

3. The system of claim 1, wherein determining the decision point along the path gesture comprises:
determining a distance that the pointer in contact with the touchscreen of the display screen has moved.

4. The system of claim 1, wherein in a case that the first swipe reaches half way to the first decision point, displaying the first command and the second command.

5. The system of claim 1, wherein the path gesture comprises a first segment and a second segment and the first decision point comprises a point where the path gesture changes from the first segment to the second segment.

6. The system of claim 1, wherein the first command, associated with the first direction, is executed based on a movement of a pointer in contact with a display screen moving from the first decision point in the first direction.

7. The system of claim 1, wherein the second command, associated with the second direction, is executed based on a movement of a pointer in contact with a display screen moving from the first decision point in the second direction.

8. The system of claim 1, further comprising processor-executable process steps executable by the processor to cause the system to:
determine the second decision point along the path gesture; and
at the second decision point, display a third command associated with the first direction and display a fourth command associated with the second direction.

9. The system of claim 1, wherein the path gesture comprises a first segment and a second segment and wherein the second segment is perpendicular to the first segment.

10. A method comprising:
providing a display screen comprising a touchscreen layered on a top of an electronic visual display of a device;
displaying a user interface of an application comprising a plurality of items;
receiving a start of path gesture on the touchscreen comprising movement of a pointer in contact with the touchscreen of the display screen wherein the path gesture first moves in a first direction associated with a first swipe and then moves in a second direction associated with a second swipe;
determining, via a processor, a first decision point along the path gesture, where the path gesture changes from the first direction to the second direction; and
locking, on the electronic visual display, a menu associated with a first decision point when the pointer reaches the first decision point;
at the first decision point, displaying the menu comprising at least two commands associated with the plurality of items of the application displayed on the user interface, wherein a first command indicates a potential movement of the pointer in a first direction, a second command indicates a potential movement of the pointer in a second direction and a third command indicates a potential movement of the pointer in a third direction so that a user can move the pointer from the first decision point to one of the commands or a second decision point, wherein the first direction is perpendicular to the second direction and third direction;
receiving, on the touchscreen the second swipe associated with the path gesture in the second direction to execute the second command on a selected item of the plurality of items of the application; and
in response to moving the pointer further down to a path of the second swipe from the first decision point, indicating the selected item of the plurality of items of the application associated with the second command more prominently than other items of the application associated with other commands.

11. The method of claim 10, wherein determining the first decision point along the path gesture comprises determining a distance that the pointer has traveled.

12. The method of claim 10, wherein the first command is executed based on the pointer moving in the first direction and the second command is executed based on the pointer moving in the second direction.

13. The method of claim 10, wherein in a case that the first swipe reaches half way to the first decision point, displaying the first command and the second command.

14. A non-transitory computer-readable medium storing program code, the program code executable by a processor of a computing system to cause the computing system to:
provide a display screen comprising a touchscreen layered on a top of an electronic visual display of a device;
display a user interface of an application comprising a plurality of items;
receive a start of a path gesture on the touchscreen of a user interface comprising movement of a pointer in contact with the touchscreen of the display screen wherein the path gesture first moves in a first direction associated with a first swipe and then moves in a second direction associated with a second swipe;
determine, via a processor, a first decision point along the path gesture, wherein the path gesture comprises a first segment that is perpendicular to a second segment, and wherein the first decision point comprises a point where the path of the gesture changes from the first segment to the second segment; and
lock, on the electronic visual display, a menu associated with the first decision point when the pointer reaches the first decision point
at the first decision point, display the menu comprising at least two commands associated with the plurality of items of the application displayed on the user interface, wherein a first command indicates a potential movement of the pointer in a first direction and a second command indicates a potential movement of the pointer in the second direction so that a user can move the pointer from the first decision point to one of the commands or a second decision point;
receive, on the touchscreen the second swipe associated with the path gesture in the second direction to execute the second command on a selected item of the plurality of items of the application;
in response to moving the pointer further down to a path of the second swipe from the first decision point, the selected item of the plurality of items of the application associated with the second command is indicated more prominently than other items of the application associated with other commands; and
receive a start of a new path gesture and lock a menu associated with the second decision point when the pointer reaches the second decision point, wherein the menu comprises at least two commands associated with the plurality of items of the application displayed on the user interface.

15. The medium of claim 14, wherein the start of the path gesture comprises movement of the pointer in contact with the touchscreen of the display screen.

16. The medium of claim 14, wherein determining the first decision point along the path gesture comprises determining a distance that the pointer in contact with the touchscreen of the display screen has moved.

17. The medium of claim 14, wherein in a case that the first swipe reaches half way to the first decision point, displaying the first command and the second command and in a case that the second swipe reaches half way to a point associated with the second command, executing the second command.

18. The medium of claim 14, wherein the second command associated with the second direction is executed based on a movement of the pointer in contact with the touchscreen of the display screen moving from the first decision point in the second direction wherein the first decision point comprises a point where the path gesture changes from the first direction to the second direction.

19. The medium of claim 14, wherein the path gesture comprises the first direction and the second direction and the first decision point comprise a point where the path of the gesture changes from the first direction to the second direction.

20. The medium of claim 14, further comprising program code executable by the processor of a computing system to cause the computing system to:

determine the second decision point along the path gesture; and at the second decision point, display a third command associated with the first direction and display a fourth command associated with the second direction.

21. The system of claim 1, wherein the menu provides at least one executable function for an application.

22. The system of claim 21, wherein at least one function for the application that is listed on the menu in the electronic visual display is executed in response to receipt in the input device of the second swipe to execute the second command.

* * * * *